US012768646B2

(12) United States Patent
Ohno

(10) Patent No.: US 12,768,646 B2
(45) Date of Patent: Oct. 20, 2026

(54) METHOD OF CALCULATING THREE-DIMENSIONAL SHAPE INFORMATION OF OBJECT SURFACE, OPTICAL SYSTEM, NON-TRANSITORY STORAGE MEDIUM, AND PROCESSING APPARATUS FOR OPTICAL SYSTEM

(71) Applicant: KABUSHIKI KAISHA TOSHIBA, Tokyo (JP)

(72) Inventor: Hiroshi Ohno, Tokyo (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 328 days.

(21) Appl. No.: 18/175,636

(22) Filed: Feb. 28, 2023

(65) Prior Publication Data

US 2024/0102796 A1 Mar. 28, 2024

(30) Foreign Application Priority Data

Sep. 16, 2022 (JP) ................................ 2022-148462

(51) Int. Cl.
*G01B 11/25* (2006.01)
*G01B 11/24* (2006.01)
*G01N 21/01* (2006.01)

(52) U.S. Cl.
CPC .............. *G01B 11/25* (2013.01); *G01B 11/24* (2013.01); *G01N 2021/0106* (2013.01)

(58) Field of Classification Search
CPC ..... G01B 11/14; G01B 11/24; G01B 11/2509; G01B 11/25; G01B 11/303;
(Continued)

(56) References Cited

U.S. PATENT DOCUMENTS 5,245,671 A * 9/1993 Kobayashi ....... G01N 21/95684
356/418
5,675,407 A 10/1997 Geng
(Continued)

FOREIGN PATENT DOCUMENTS

CN 103115580 A * 5/2013
JP H6-34346 A 2/1994
(Continued)

OTHER PUBLICATIONS

Walton L. Howes, "Rainbow schlieren and its applications," Applied Optics, vol. 23, No. 14, pp. 2449-2460 (1984).
(Continued)

*Primary Examiner* — Rebecca C Bryant
(74) *Attorney, Agent, or Firm* — Finnegan, Henderson, Farabow, Garrett & Dunner, LLP

(57) ABSTRACT

According to an embodiment, a method of calculating three-dimensional shape information of an object surface comprising: acquiring, color-mapping, and calculating. The acquiring includes acquiring an image captured through an anisotropic wavelength selection portion having at least two different regions configured to select a wavelength to be shielded and a wavelength to be passed from reflected light from the object surface illuminated with light. The color-mapping includes color-mapping light beam directions based on the image. The calculating includes calculating three-dimensional shape information of the object surface from a geometric optics relational expression between an inclination angle of the object surface and the light beam direction.

22 Claims, 8 Drawing Sheets

(58) Field of Classification Search

CPC .. G01B 11/0608; G01B 11/002; G01B 21/20; G01B 9/02002; G06T 2207/10024; G06T 7/55; G06T 15/00; G01N 2021/6421

USPC ........ 356/601–623; 382/152, 203, 285, 154; 702/167

See application file for complete search history.

(56) References Cited

U.S. PATENT DOCUMENTS

| | | | |
|---|---|---|---|
| 10,732,102 | B2 | 8/2020 | Ohno et al. |
| 2004/0145753 | A1 | 7/2004 | Lim et al. |
| 2007/0153285 | A1 | 7/2007 | Elton et al. |
| 2016/0202048 | A1 | 7/2016 | Meng et al. |

FOREIGN PATENT DOCUMENTS

| | | | | |
|---|---|---|---|---|
| JP | H0814849 | A | * | 1/1996 |
| JP | H9-49803 | A | | 2/1997 |
| JP | 2000-81319 | A | | 3/2000 |
| JP | 2008-191040 | A | | 8/2008 |
| JP | 2016-128816 | A | | 7/2016 |
| JP | 2018-128436 | A | | 8/2018 |
| JP | 6818702 | B2 | | 1/2021 |

OTHER PUBLICATIONS

Hiroshi Ohno et al., “One-shot BRDF imaging system to obtain surface properties,” Optical Review, vol. 28, pp. 655-661, https://doi.org/10.1007/s10043-021-00689-x (2021).

Japan Patent Office, Decision to Grant a Patent in JP App. No. 2022-148462 (Mar. 3, 2026).

Japan Patent Office, Office Action in JP App. No. 2022-148462 (Dec. 2, 2025).

* cited by examiner

METHOD OF CALCULATING THREE-DIMENSIONAL SHAPE INFORMATION OF OBJECT SURFACE, OPTICAL SYSTEM, NON-TRANSITORY STORAGE MEDIUM, AND PROCESSING APPARATUS FOR OPTICAL SYSTEM

CROSS-REFERENCE TO RELATED APPLICATIONS

This application is based upon and claims the benefit of priority from Japanese Patent Application No. 2022-148462, filed Sep. 16, 2022, the entire contents of all of which are incorporated herein by reference.

FIELD

Embodiments described herein relate generally to a method of calculating the three-dimensional shape information of an object surface, an optical system, a non-transitory storage medium, and a processing apparatus for the optical system.

BACKGROUND

In various industries, surface measurement of an object in a noncontact state is important. As a conventional method, there exists a method in which an object is illuminated with spectrally divided light beams, an imaging element acquires each spectrally divided image, and the direction of each light beam is estimated, thereby acquiring the three-dimensional shape information of the object surface.

BRIEF DESCRIPTION OF THE DRAWING(S)

FIG. 3 is a schematic view showing the relationship among incident light, object point, reflected light, normal direction, inclination angle θx, and the like.

DETAILED DESCRIPTION

Figure 1:
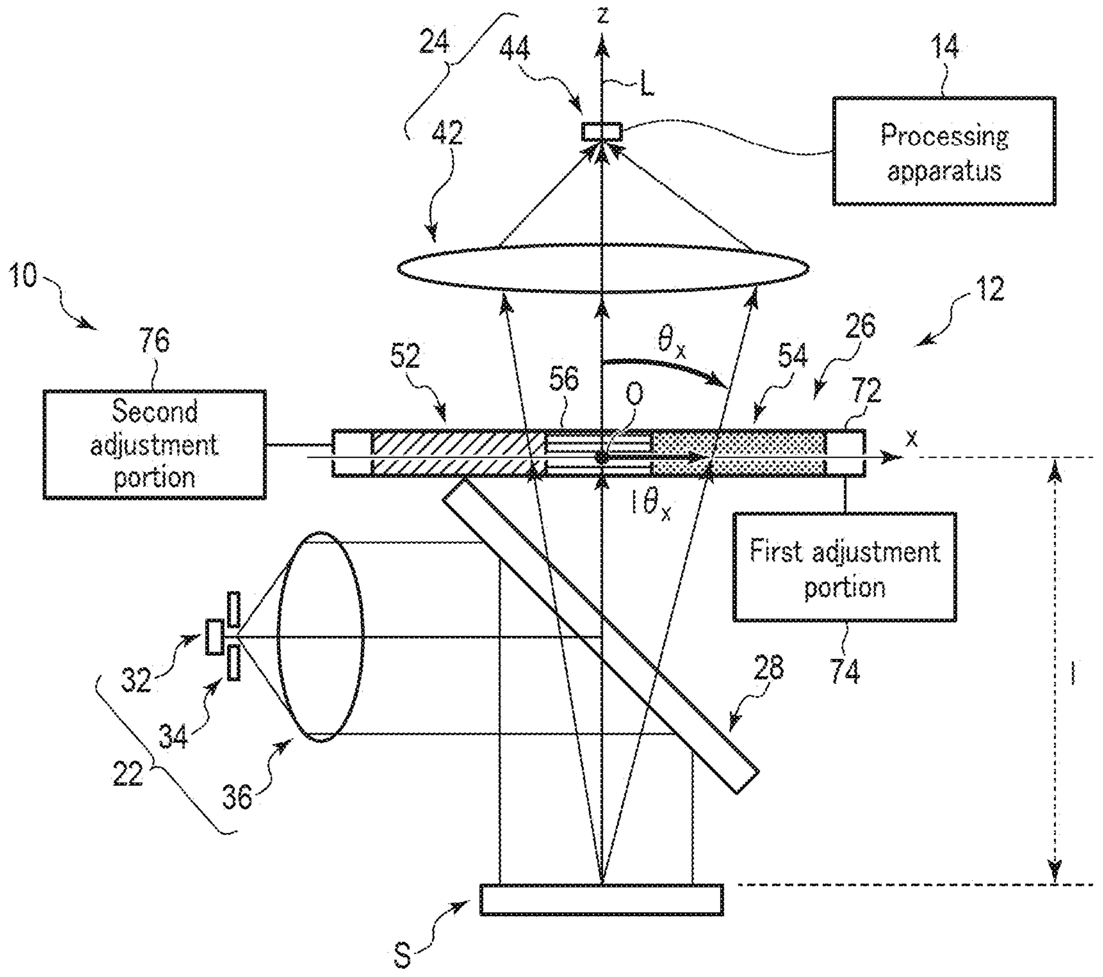
FIG. 1 is a schematic view showing an optical system according to the first embodiment.

An object of an embodiment is to provide a method of calculating the three-dimensional shape information of an object surface, an optical system, a non-transitory storage medium storing a calculation program for the three-dimensional shape information of the object surface, and a processing apparatus for the optical system, which acquire the three-dimensional shape information of an object surface without spectrally dividing a light beam on the illumination side.

According to the embodiment, a method of calculating three-dimensional shape information of an object surface comprising: acquiring, color-mapping, and calculating. The acquiring includes acquiring an image captured through an anisotropic wavelength selection portion having at least two different regions configured to select a wavelength to be shielded and a wavelength to be passed from reflected light from the object surface illuminated with light. The color-mapping includes color-mapping light beam directions based on the image. The calculating includes calculating three-dimensional shape information of the object surface from a geometric optics relational expression between an inclination angle of the object surface and the light beam direction.

Embodiments will now be described with reference to the accompanying drawings. The drawings are schematic or conceptual, and the relationship between the thickness and the width of each part, the size ratio between parts, and the like do not always match the reality. Also, even same portions may be illustrated in different sizes or ratios depending on the drawing. In the present specification and the drawings, the same elements as described in already explained drawings are denoted by the same reference numerals, and a detailed description thereof will appropriately be omitted.

First Embodiment

An optical system 10 according to this embodiment will be described below with reference to FIGS. 1 to 4.

In this specification, light is a kind of electromagnetic wave and includes X rays, ultraviolet rays, visible light, infrared rays, and microwaves. That is, any electromagnetic wave can be used as long it can be expressed by Maxwell's equations. In this embodiment, it is assumed that the light is visible light and for example, the wavelength falls in a region of 400 nm to 750 nm.

FIG. 1 is a schematic sectional view of the optical system 10 according to this embodiment.

The optical system 10 according to this embodiment includes an optical apparatus 12 and a processing apparatus 14.

The optical apparatus 12 includes an illumination portion 22, an imaging portion 24, and a wavelength selection portion (multi-wavelength opening) 26.

The illumination portion 22 includes a light source 32, an opening 34, and an illumination lens 36. The light source 32 may be anything that emits light. In this case, the light source 32 is, for example, a white LED. The opening 34 is a light-shielding plate provided with a slit. The light source 32 is arranged on the focal plane of the illumination lens 36. In this configuration, light emitted from the light source 32 is partially shielded by the opening 34 and partially passes. The light that has passed through the opening 34 is converted into substantially parallel light by the illumination lens 36. Accordingly, the illumination portion 22 converts light from the light source 32 into parallel light through the illumination lens 36. However, the parallel light may have a divergence angle. The free-form surface of the illumination lens 36 can be designed by a unique optical design method using advanced geometric optics so as to efficiently output a light beam with high parallelism.

The surface of an object S is irradiated with parallel light from the illumination portion 22 through a beam splitter 28.

The parallel light irradiates the surface (object surface) of the object S along the z-axis. Irradiating the surface of the object S with the parallel light makes it possible to align the incident directions of light at the respective points on the surface of the object S. That is, the optical apparatus 12 is possible to align the incident directions of light throughout the entire imaging plane.

The imaging portion 24 is directed to a region of the surface of the object S which is illuminated with parallel light. The imaging portion 24 includes an imaging optical element 42 and an image sensor (color image sensor) 44. The imaging optical element 42 is, for example, an imaging lens. The imaging optical element 42 has a focal length f. Referring to FIG. 1, the imaging lens is schematically drawn and represented by one lens but may be a coupling lens formed by a plurality of lenses. Alternatively, the imaging optical element 42 may be a concave mirror, a convex mirror, or a combination thereof. That is, the imaging optical element 42 can be any optical element having a function of collecting, to a conjugate image point on the image sensor 44, a light beam group emerging from one point of the object S, that is, an object point. Collecting (condensing) a light beam group emerging from an object point on the surface of the object S to an image point by the imaging optical element 42 is called imaging or transferring an object point to an image point (the conjugate point of the object point). In this manner, the object point and the image point have a conjugate relationship via the imaging optical element 42. The aggregate plane of conjugate points to which a light beam group emerging from a sufficiently apart object point is transferred by the imaging optical element 42 will be referred to as the focal plane of the imaging optical element 42. A line that is perpendicular to the focal plane and passes through the center of the imaging optical element 42 is defined as an optical axis L. A point at which the optical axis L crosses the focal plane will be referred to as a focal point.

Note that an xyz orthogonal coordinate system is defined with the z-axis being a direction along the optical axis L, the x-axis being orthogonal to the z-axis, and the y-axis being orthogonal to the x-axis and the z-axis. In this case, the xyz coordinate system is defined with respect to the wavelength selection portion 26, and an origin O is located on a third wavelength selection region 56 (to be described later). The z-axis intersects the wavelength selection portion 26. A plurality of wavelength selection regions 52, 54, and 56 intersect the x-axis. The y-axis is along the plurality of wavelength selection regions 52, 54, and 56. However, this is not exhaustive, and a plurality of wavelength selection regions may intersect the y-axis. It suffices if at least two wavelength selection regions intersect the x-axis.

The wavelength selection portion 26 according to this embodiment has a stripe shape parallel to the longitudinal direction of the line sensor 44 (to be described later). The wavelength selection portion 26 is provided between the surface of the object S and the imaging portion 24. The wavelength selection portion 26 includes at least two or more wavelength selection regions 52, 54, and 56. Of these wavelength selection regions, the two wavelength selection regions are the first wavelength selection region 52 and the second wavelength selection region 54. The first wavelength selection region 52 passes a light beam having a wavelength spectrum including a first wavelength. In this case, to pass a light beam means to direct the light beam from an object point to an image point by transmission or reflection. In this embodiment, the first wavelength selection region 52 transmits a light beam having the first wavelength. In contrast to this, the first wavelength selection region 52 substantially shields against a light beam having a second wavelength. In this case, to shield against a light beam means to inhibit the light beam from passing. That is, this means to inhibit the light beam from propagating from the object point to the image point.

The second wavelength selection region 54 passes a wavelength spectrum including a light beam having the second wavelength. Accordingly, in this embodiment, the second wavelength selection region 54 transmits a light beam having the second wavelength. In contrast to this, the second wavelength selection region 54 substantially shields against a light beam having the first wavelength.

In this embodiment, the first wavelength selection region 52 and the second wavelength selection region 54 each extend along, for example, the y-axis. The first wavelength selection region 52 and the second wavelength selection region 54 intersect the x-axis.

For example, the first wavelength is that of blue (B) light, which is 450 nm, and the second wavelength is that of red (R) light, which is 650 nm. This is not exhaustive, and each wavelength is not specifically limited.

The placements of the wavelength selection regions 52 and 54 of the wavelength selection portion 26 are anisotropic to the axis L of the imaging optical element 42. That is, if the axis L is an axis, the overall shape (placement) of the wavelength selection regions 52 and 54 depend on the rotational direction around the axis L. Accordingly, the wavelength selection portion 26 will also be referred to as an anisotropic multi-wavelength opening. In this embodiment, the first wavelength selection region 52 and the second wavelength selection region 54 face the axis L, and the wavelength selection portion 26 is anisotropic.

In this embodiment, the wavelength selection portion 26 includes the third wavelength selection region 56. The third wavelength selection region 56 is provided between the first wavelength selection region 52 and the second wavelength selection region 54 along the x-axis. The third wavelength selection region 56 is arranged on the axis L. The third wavelength selection region 56 passes a wavelength spectrum including a light beam having the third wavelength. In contrast to this, the third wavelength selection region 56 substantially shields against light beams having the first and second wavelengths. The third wavelength selection region 56 extends along the y-axis.

The first wavelength selection region 52 substantially shields against a light beam having the third wavelength. The second wavelength selection region 54 substantially shields against a light beam having the third wavelength. For example, the third wavelength is that of green (G) light, which is 550 nm.

The placement of the wavelength selection regions of the wavelength selection portion 26 can be set as appropriate. The wavelength selection regions of the wavelength selection portion 26 are, for example, formed along the x-axis so as to respectively have appropriate widths in the x-axis direction in the ascending order of wavelengths to be transmitted through the wavelength selection regions. In contrast to this, the wavelength selection regions of the wavelength selection portion 26 are, for example, formed along the x-axis so as to respectively have appropriate widths in the x-axis direction in the descending order of wavelengths to be transmitted through the wavelength selection regions. Alternatively, the placement of the wavelength selection regions of the wavelength selection portion 26 can be set as appropriate such that, for example, a region that passes green (G) light of a wavelength of 550 nm and shields against other light, a region that passes blue (B) light of a wavelength of 450 nm and shields against other light, and a region that passes red (R) light of a wavelength of 650 nm and shields against other light are arranged in the order named.

The image sensor 44 has at least one pixel. Each pixel can receive at least two light beams having different wavelengths, that is, a light beam having the first wavelength and a light beam having the second wavelength. The image sensor 44 according to this embodiment can further receive a light beam having the third wavelength.

A plane including the region where the image sensor 44 is arranged is the image plane of the imaging optical element 42. The image sensor 44 can be either an area sensor or a line sensor. The area sensor is a sensor in which pixels are arrayed in an area on the same surface. The line sensor is a sensor in which pixels are linearly arrayed. Each pixel may include three color channels of R, G, and B.

In this embodiment, the image sensor 44 is a line sensor. The longitudinal direction of the image sensor (line sensor) 44 is a direction along the y-axis. Each pixel of the image sensor 44 includes at least two color channels of red (R) light and blue (B) light. That is, the image sensor 44 can receive blue (B) light of a wavelength of 450 nm and red (R) light of a wavelength of 650 nm through independent color channels. In this embodiment, each pixel can further receive green (G) light of a wavelength of 550 nm through an independent color channel.

Figure 2:
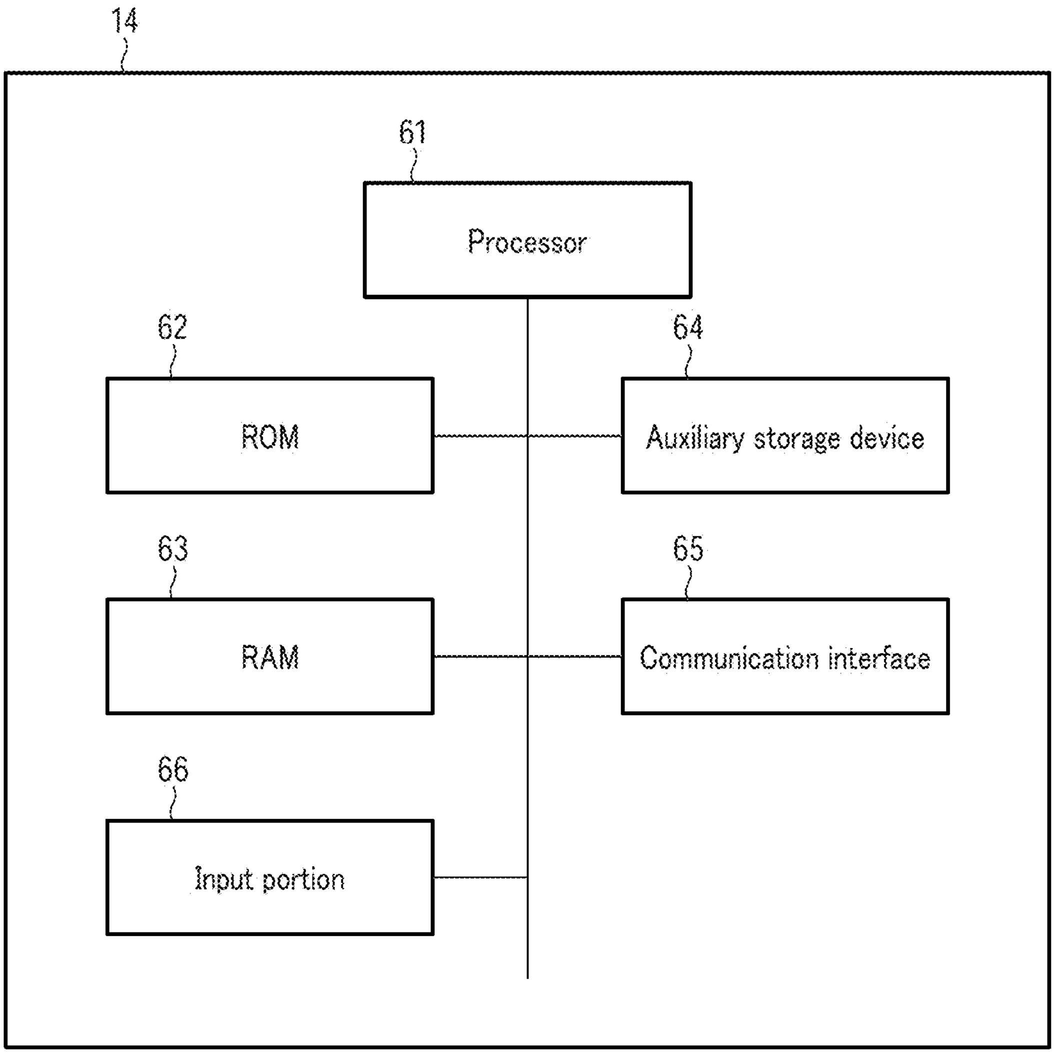
FIG. 2 is a schematic block diagram of a processing apparatus for the optical system.

The processing apparatus 14 is connected to the image sensor 44 through a wire or wirelessly. FIG. 2 is a block diagram showing an example of the processing apparatus 14 for the optical system 10 according to the embodiment.

The processing apparatus 14 includes, for example, a processor 61 (controller), a ROM (storage medium) 62, a RAM 63, an auxiliary storage device 64 (storage medium), a communication interface 65 (communication portion), and an input portion 66.

The processor 61 is equivalent to the central part of a computer that performs processes such as calculation and control necessary for processing of the processing apparatus 14 and integrally controls the overall processing apparatus 14. The processor 61 executes control to implement various functions of the processing apparatus 14 based on programs such as system software, application software, or firmware stored in a non-transitory storage medium such as the ROM 62 or the auxiliary storage device 64. The processor 61 includes, for example, a CPU (Central Processing Unit), a MPU (Micro Processing Unit), a DSP (Digital Signal Processor), an ASIC (Application Specific Integrated Circuit), or an FPGA (Field Programmable Gate Array). Alternatively, the processor 61 is a combination of a plurality of units of these units. The processor 61 provided for the processing apparatus 14 may include one or a plurality of processors.

The ROM 62 is equivalent to the main storage device of the computer whose central part is the processor 61. The ROM 62 is a nonvolatile memory dedicated to read out data. The ROM 62 stores the above-mentioned programs. The ROM 62 stores data, various set values, and the like used to perform various processes by the processor 61.

The RAM 63 is equivalent to the main storage device of the computer whose central part is the processor 61. The RAM 63 is a memory used to read out and write data. The RAM 63 is used as a so-called work area or the like for storing data to be temporarily used to perform various processes by the processor 61.

The auxiliary storage device 64 is equivalent to the auxiliary storage device of the computer whose central part is the processor 61. The auxiliary storage device 64 is, for example, an EEPROM (Electrically Erasable Programmable Read-Only Memory)®, an HDD (Hard Disk Drive), or an SSD (Solid State Drive). The auxiliary storage device 64 sometimes stores the above-mentioned programs. The auxiliary storage device 64 saves data used to perform various processes by the processor 61, data generated by processing of the processor 61, various set values, and the like.

Programs stored in the ROM 62 or the auxiliary storage device 64 include programs for controlling the processing apparatus 14. For example, a three-dimensional shape program for an object surface is preferably stored in the ROM 62 or the auxiliary storage device 64.

The communication interface 65 is an interface for communicating with another apparatus through a wire or wirelessly via a network or the like, receiving various kinds of information transmitted from another apparatus, and transmitting various kinds of information to another apparatus. The processing apparatus 14 acquires image data obtained by the image sensor 44 via the communication interface 65.

The processing apparatus 14 preferably includes the input portion 66 such as a keyboard for inputting, for example, the placement of the anisotropic wavelength selection portion 26 and selection of a type. The input unit 66 may input various kinds of information to the processor 61 wirelessly via the communication interface 65.

The processing apparatus 14 executes processing of implementing various functions by causing the processor 61 to execute programs or the like stored in the ROM 62 and/or the auxiliary storage device 64 or the like. Note that it is also preferable to store the control program of the processing apparatus 14 not in the ROM 62 and/or auxiliary storage device 64 of the processing apparatus 14, but in an appropriate server or cloud. In this case, the control program is executed while the server or the cloud communicates with, for example, the processor 61 of the optical system 10 via the communication interface 65. That is, the processing apparatus 14 according to this embodiment may be provided in the optical system 10 or in the server or cloud of systems at various inspection sites apart from the optical system. It is also preferable to store the three-dimensional shape program for an object surface not in the ROM 62 or the auxiliary storage device 64 but in the server or the cloud, and execute it while the server or the cloud communicates with, for example, the processor 61 of the optical system 10 via the communication interface 65. The processor 61 (processing apparatus 14) can therefore execute a program concerning three-dimensional shape calculation (to be described later).

The processor 61 (processing device 14) controls the emission timing of the light source 32 of the illumination portion 22, the acquisition timing of image data by the image sensor 44, the acquisition of image data from the image sensor 44, and the like.

The basic operation of the optical system 10 described above will be described.

The light source 32 of the illumination portion 22 emits light under the control of the processing apparatus 14. The light from the light source 32 substantially becomes parallel light. The surface of the object S is substantially irradiated with the parallel light through the beam splitter 28.

In normal imaging without using the wavelength selection portion 26, reflected light from an object point on the surface of the object S is directly collected at one image point by image formation regardless of the direction of the reflected light. For this reason, information concerning the direction of reflected light from the object point cannot be obtained from a captured image.

Assume that there is an object point on the optical axis L intersecting the surface of the object S. The object point on the optical axis L is formed into an image at an image point of the image sensor 44 on the optical axis. At this time, a light beam propagating from the object point on the optical axis L parallelly to the optical axis L passes through an origin O of the wavelength selection portion 26. In contrast to this, a light beam propagating from the object point obliquely to the optical axis L passes through a position away from the origin O on the wavelength selection portion 26. In addition, light beams passing through the wavelength selection portion 26 become light beams having different wavelength spectra according to the regions of the wavelength selection portion 26 (the first wavelength selection region 52, the second wavelength selection region 54, and the third wavelength selection region 56) through which the light beams have passed.

In a case where a light beam is projected on an x-z plane, the inclination angle of the light beam with respect to the optical axis L is represented by θx. This light beam is called a direction component of light in the x direction. The direction component θx of the light is obtained by a wavelength spectrum when the light passes through the wavelength selection portion 26. At this time, as shown in FIG. 2, a light beam changes in color according to the direction component θx. Even if the direction component θx of light is not strictly obtained by a wavelength spectrum, the optical system 10 can discriminate whether the direction of the light is inclined to the positive direction of the x-axis or the negative direction of the x-axis. That is, since the wavelength selection portion 26 is anisotropic, the optical system 10 can discriminate whether the x-axis direction component θx in the reflecting direction of the light is positive or negative. This enables the optical system 10 according to this embodiment to color-map light beam directions from the surface of the object S based on the image captured through the anisotropic wavelength selection portion 26.

The distribution of directions of reflected light beams from an object point on the surface of the object S can be represented by a distribution function called a BRDF (Bidirectional Reflectance Distribution Function). In general, the BRDF changes depending on the surface properties/shape of the object S. For example, if the surface of the object S is rough, reflected light spreads in various directions and the BRDF represents a wide distribution. That is, the reflected light exists at a wide angle. On the other hand, if the surface of the object S is a mirror surface, reflected light includes almost only specular reflection components, and the BRDF represents a narrow distribution. In this manner, the BRDF reflects the surface properties/shape of the object S. Here, the surface properties/shape of the object S may be a surface roughness, fine unevenness on a micron order, tilt of the surface, or distortion. That is, any properties/shape concerning the height distribution of the surface of the object S can be used. If the surface properties/shape of the object S is formed by a fine structure, the typical structure scale can be any scale such as a nano scale, a micron scale, or a milli scale.

According to the example shown in FIG. 1, the wavelength spectrum of light acquired at an image point of the image sensor 44 changes according to the BRDF at an object point on the central axis (z-axis) of the xyz coordinate system. For example, if the surface of the object S at an object point is flat (the surface is a mirror surface or nearly a mirror surface), the BRDF represents a narrow distribution, and the light reflected by the object point passes through the third wavelength selection region 56 sandwiched between the first wavelength selection region 52 and the second wavelength selection region 54. That is, the light reflected by the object point does not pass through the first wavelength selection region 52 and the second wavelength selection region 54.

In contrast to this, if a defect such as a minute defect exists at an object point on the surface of the object S, the BRDF represents a wide distribution, and the light reflected by the object point passes through the first wavelength selection region 52 or the second wavelength selection region 54. Accordingly, light reaching an image point of the image sensor 44 differs in wavelength spectrum depending on the BRDF at the object point. As a light reaching the image point of the image sensor 44 differs in wavelength spectrum, the color (light beam direction) acquired by the image sensor 44 differs. This makes the optical system 10 possible to discriminate a difference in BRDF according to the color (light beam direction). When the optical system 10 discriminates a difference in BRDF, the optical system 10 can discriminate the presence/absence of a minute defect at the object point.

If a BRDF is anisotropic, the light reflected by the object point may pass through the first wavelength selection region 52 and not pass the second wavelength selection region 54. Alternatively, the light reflected by the object point may not pass through the first wavelength selection region 52 and pass through the second wavelength selection region 54. In these cases, the image sensor 44 acquires different colors (light beam directions). In either of the cases, the color acquired by the image sensor 44 differs from that in a case where a BRDF is isotropic. These make the optical system 10 possible to identify by color whether the BRDF is anisotropic or isotropic. The optical system 10 can also identify the type of anisotropic BRDF. Such identification is difficult to perform if the wavelength selection portion 26 is isotropic instead of anisotropic.

If the BRDF on the surface of the object S represents a narrow distribution, the optical system 10 can reconstruct a three-dimensional shape including a minute shape as will be described later. In practice, using the optical system 10 of this embodiment can construct a method of calculating three-dimensional shape information by acquiring the direction of light reflected by the surface of the object S and obtaining the normal direction of the surface of the object S.

Figure 3:
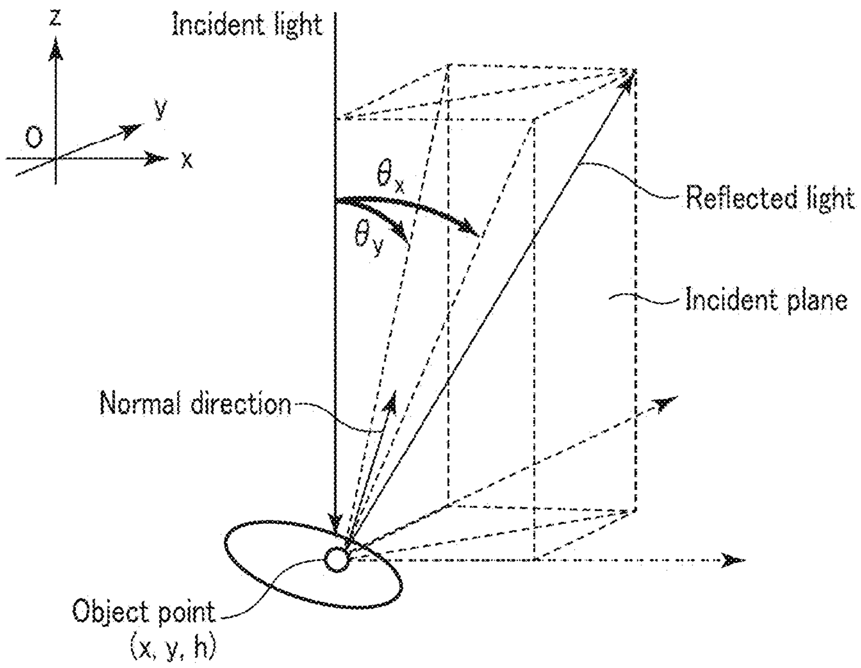

Reflected light from the surface of the object S often has a specular reflection component or its neighborhood component whose intensity is high. In particular, as the surface of the object S becomes nearly a mirror surface, the reflected light includes almost only specular reflection components. That is, the BRDF represents a narrow distribution. As shown in FIG. 3, the direction of a specular reflection component is located on a plane (incident plane) defined by the direction of light incident on a point (to be referred to as an object point hereinafter) on the surface of the object S and the normal direction of the surface. The normal direction is determined such that the incident angle is equal to the reflection angle. Accordingly, if the direction of incident light is known, the optical system 10 can determine the normal direction at the object point on the surface of the object S as long as the optical system 10 can measure the direction of specularly reflected light.

In this case, letting (x, y, h) be the position of an object point on the surface of the object S and h be the height, if the height h is determined as a function of x and y, the optical system 10 can obtain the three-dimensional shape of the surface of the object S. In this case, x and y represent a position of an object point projected on an imaging plane. The normal direction of the surface of the object S can be represented as a spatial partial differential of the height h. When the optical system 10 uses the relationship between the normal direction and the direction of specularly reflected light, the optical system 10 can derive an equation representing the relationship between the height h and the direction components (inclination angles θx and θy) of the specularly reflected light. That is, the optical system 10 can derive the following partial differential equation with respect to the height h.

$$\nabla h(x, y) = -\frac{1}{2}\begin{pmatrix}\theta_x \\ \theta_y\end{pmatrix} \tag{1}$$

Equation (1) is a geometric optics relational expression and is a partial differential equation that partially differentiates the height h of the surface of the object S by using a position (x, y) on the object surface. The position (x, y) on the object surface can be made to correspond to a position on the imaging plane one to one. Accordingly, in this case, the position of the object point projected on the imaging plane is represented in the same manner as the position (x, y) on the object surface. That is, when the optical system 10 solves equation (1), the optical system 10 can represent the height h of the surface of the object S with the position (x, y) of the object point projected on the imaging plane. That is, the optical system 10 can obtain the three-dimensional shape of the surface of the object S.

In addition, equation (1) can be calculated by using FFT (Fast Fourier Transformation). This makes the optical system 10 possible to implement fast calculation. That is, the optical system 10 can instantly calculate three-dimensional shape information based on two direction components (inclination angles θx and θy) of light. In addition, if the periphery of an object region (object point) is flat, the optical system 10 can calculate three-dimensional shape information based on only one direction component (inclination angle θx) of light. That is, the height h at the position (x, y, h) on the surface of the object S is obtained from equation (1) as follows.

$$h(x, y) = -\int_{x_0}^{x} \frac{\theta_x(x', y)}{2} dx' \tag{2}$$

In this case, x=x0 represents a peripheral flat portion, and the height is 0. Equation (2) can be reduced to simple four arithmetic operations and calculations can be parallelized, and hence the optical system 10 can implement fast calculation. Accordingly, the optical system 10 instantly obtain the height (the height with respect to the peripheral flat portion of the object point) h at the position (x, y, h) of the object point on the surface of the object S based on one direction component (inclination angle θx) of light.

Figure 4:
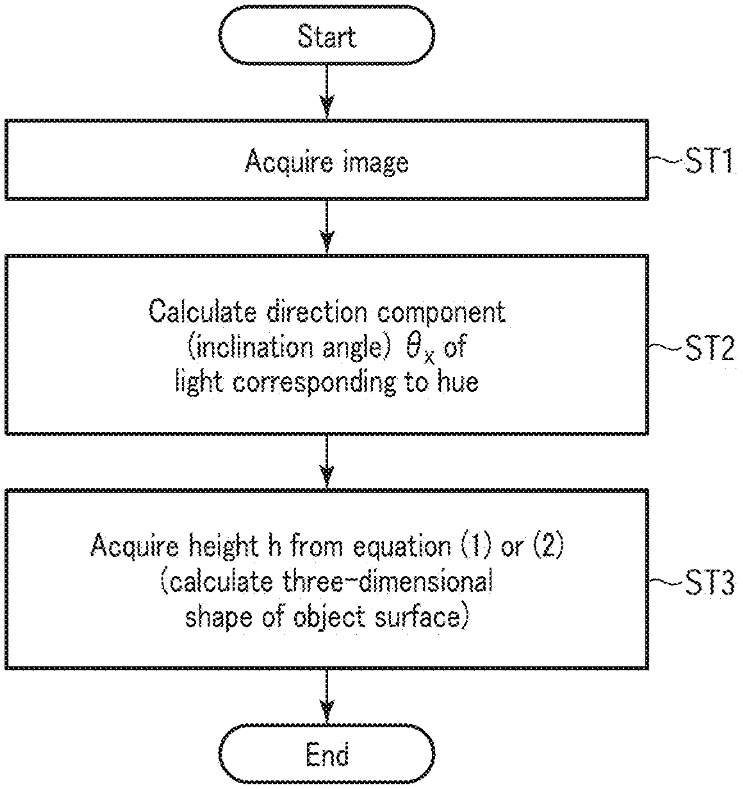
FIG. 4 is a schematic flowchart of processing performed by the processing apparatus for the optical system.

A three-dimensional shape is calculated using the processing apparatus 14 substantially in the same manner as that shown in FIG. 4.

The processing apparatus 14 acquires an image by the imaging portion 24 through the anisotropic wavelength selection portion 26 (step ST1). The processing apparatus 14 acquires an image by causing the image sensor 44 to form a light beam passing through the imaging optical element 42 into an image.

The acquired image is provided with a color corresponding to the light beam direction. The optical system 10 according to this embodiment can acquire the BRDF of the surface of the object S. This makes the optical system 10 possible to discriminate the presence/absence of a minute defect. The processing apparatus 14 calculates the direction component (inclination angle) θx of light corresponding to a hue (step ST2).

Subsequently, the processing apparatus 14 acquires the height h based on equation (1) or equation (2) (step ST3). At this time, the processing apparatus 14 calculates the three-dimensional shape of the surface of the object S. The optical system 10 according to this embodiment can measure the three-dimensional shape information of a minute defect on the surface of the object S if the BRDF represents a narrow distribution, that is, the surface of the object S is nearly a mirror surface.

The processing apparatus 14 according to this embodiment, for example, stores a three-dimensional shape information calculation program including imaging of image data using the image sensor 44, acquisition of the relationship between colors and light beam directions (inclination angles θx and θy) based on the anisotropic wavelength selection portion 26, and calculation of equations (1) and (2). In this embodiment, the processing apparatus 14 can perform, as a series of processes, emission of the light source 32, image acquisition by the image sensor 44, and three-dimensional shape calculation of the image acquired by the image sensor 44.

Accordingly, the processor 61 of the processing apparatus 14 according to this embodiment reads and executes the three-dimensional shape information calculation program stored in a storage portion such as the ROM 62 or the auxiliary storage device 64 to color-map the height (the height with respect to the peripheral flat portion of the object point) h at the position (x, y, h) of each object point on the surface of the object S and light beam directions from the image captured through the anisotropic wavelength selection portion 26 and calculate the three-dimensional shape information of the surface of the object S from the geometric optics relational expression between the inclination angle θx of the surface of the object S and the light beam direction.

The object S according to this embodiment may move in the x-axis direction with respect to, for example, the imaging portion 24 and the wavelength selection portion 26. In this case, the optical system 10 can appropriately set the emission timing of the light source 32 and an image acquisition timing.

Referring to FIG. 1, the position of the wavelength selection portion 26 with respect to the surface of the object S is represented by a height (distance) I. Letting θx be an x-axis direction component of the inclination angle of light, an x component at the position where light passes through the wavelength selection portion 26 can be represented as follows.

$$x = l\theta_x \tag{3}$$

Equation (3) indicates that as the height I increases, x increases. That is, in the optical system 10, even if the inclination angle θx of light is small, increasing the height I can increase the absolute value of the position of x passing through the wavelength selection portion 26. This means that the optical system 10 can identify the small inclination angle θx of light by increasing the height I of the wavelength selection portion 26. This enables the optical system 10 according to this embodiment to grasp a small change in BRDF by adjusting the height I. In addition, the optical system 10 according to this embodiment can detect a smaller defect. The optical system 10 according to the embodiment can measure the shape of a more minute defect in three-dimensional shape measurement.

The height I of the wavelength selection portion 26 allows it to be freely arranged independently of the imaging optical element 42. That is, in the optical system 10, if, for example, the focal length of the imaging optical element 42 is represented by f, the height I can be set to be larger than the focal length f of the imaging optical element 42. In the optical system 10 according to this embodiment, the acquisition sensitivity of a BRDF can be increased independently of the imaging optical element 42. In addition, in the optical system 10 according to the embodiment, the measurement accuracy of a three-dimensional shape can be improved independently of the imaging optical element 42.

The optical apparatus 12 according to this embodiment includes a support portion 72 that supports the outer edge of the wavelength selection portion 26, a first adjustment portion 74 that adjusts the distance between the support portion 72 and the surface of the object S so as to make them approach or be separated from each other, and a second adjustment portion 76 that enables the support portion 72 to rotate about the optical axis L.

As the first adjustment portion 74, for example, a servo motor is used. The first adjustment portion 74 is preferably controlled by the processing apparatus 14 wirelessly or via a wire to control the placement of the support portion 72, that is, the placement of the wavelength selection portion 26 along the optical axis L in the z-axis direction. The optical system 10 can efficiently acquire a minute defect and the like by optimizing the distance between the anisotropic wavelength selection portion 26 and the surface of the object S.

As the second adjustment portion 76, for example, a servo motor is used. The second adjustment portion 76 is preferably controlled by the processing apparatus 14 wirelessly or via a wire to control the placement of the support portion 72, that is, the placement of the wavelength selection portion 26 around the optical axis L (around the axis of the origin O). In this manner, the second adjustment portion 76 enables the wavelength selection portion 26 to rotate about, for example, the optical axis L through a desired angle with respect to the imaging portion 24. If a BRDF has special anisotropy, the processing apparatus 14 can acquire an accurate BRDF distribution by causing the image sensor 44 to image the surface of the object S while causing the second adjustment portion 76 to rotate the wavelength selection portion 26 about the optical axis L.

Since the optical apparatus 12 according to this embodiment is configured such that the wavelength selection portion 26 is arranged in front of the imaging portion 24, the optical apparatus 12 can be incorporated in any type of imaging portion (that is, camera) 24. That is, the optical apparatus 12 is advantageous in having a wide selection range of cameras.

The wavelength selection portion 26 according to this embodiment has been described in the case in which the first wavelength selection region 52 is arranged at a position away from the origin O, the second wavelength selection region 54 is arranged at a position away from the origin O, and the third wavelength selection region 56 is arranged at the origin O. For example, the third wavelength selection region 56 is also preferably formed as a light-shielding region that does not pass light of any wavelength. At this time, the first wavelength selection region 52 and the second wavelength selection region 54 are also preferably arranged adjacent to each other on both sides of the origin O.

Application Example

Figure 5:
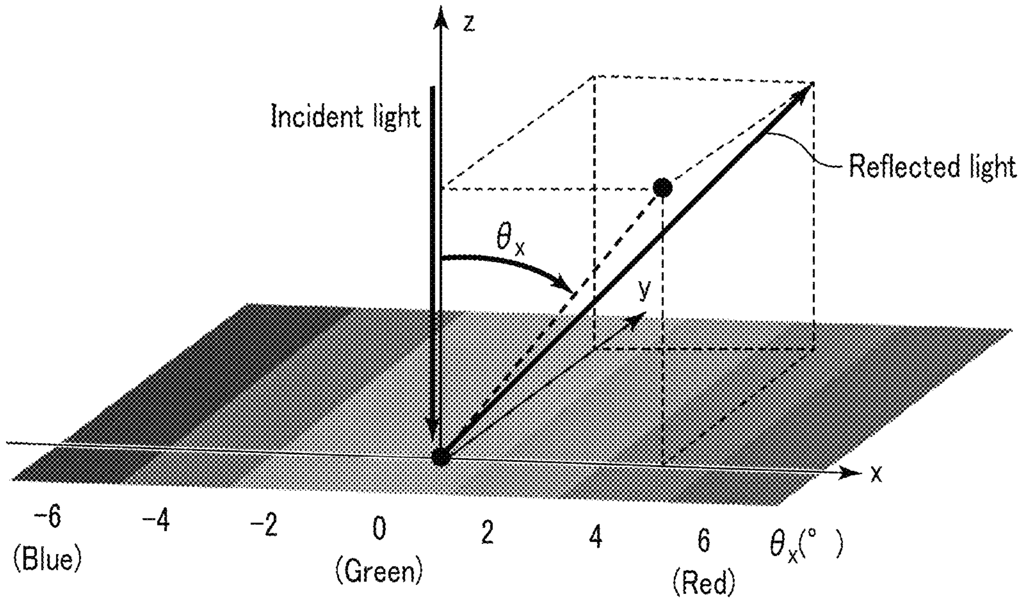
FIG. 5 is a schematic view showing the relationship among an anisotropic wavelength selection portion with respect to an xyz orthogonal coordinate system, incident light, reflected light, and a direction component of light in the x-axis direction.

FIG. 5 shows the relationship among the wavelength selection regions (anisotropic wavelength selection portion) that select transmission/shielding wavelength spectra crossing the orthogonal coordinate system x, incident light, reflected light, and the inclination angle θx. The wavelength selection portion 26 in FIG. 5 is illustrated such that a plurality of (seven) wavelength selection regions are partitioned. Assume that a rainbow filter is used which sequentially passes longer wavelengths from the left side to the right side so as to make blue, green, and red respectively appear on the left end, the origin O, and the right end in FIG. 5. In practice, as shown in FIG. 5, the wavelength selection portion 26 is preferably multi-colored instead of being formed into two wavelength selection regions (two colors) or three wavelength selection regions (three colors).

If inclination angle θx=0°, light imaged by the image sensor 44 through the wavelength selection portion 26 is acquired as green (G) light. If inclination angle θx=−2°, light imaged by the image sensor 44 through the wavelength selection portion 26 is acquired as blue (B) light. If inclination angle θx=+2°, light imaged by the image sensor 44 through the wavelength selection portion 26 is acquired as red (R) light.

Figure 6:
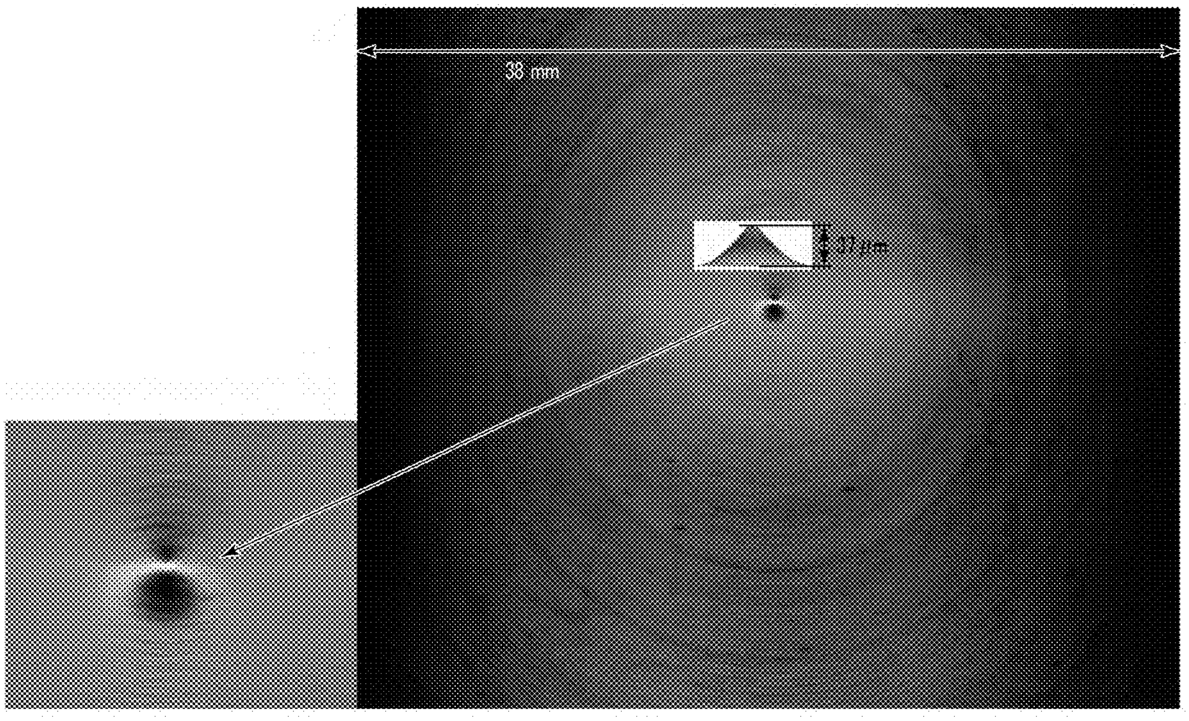
FIG. 6 is a view showing an example of the image acquired by using the optical system according to the first embodiment.

FIG. 6 shows an example of imaging an aluminum plate having a convex defect by using the optical system 10 according to this embodiment.

Figure 7:
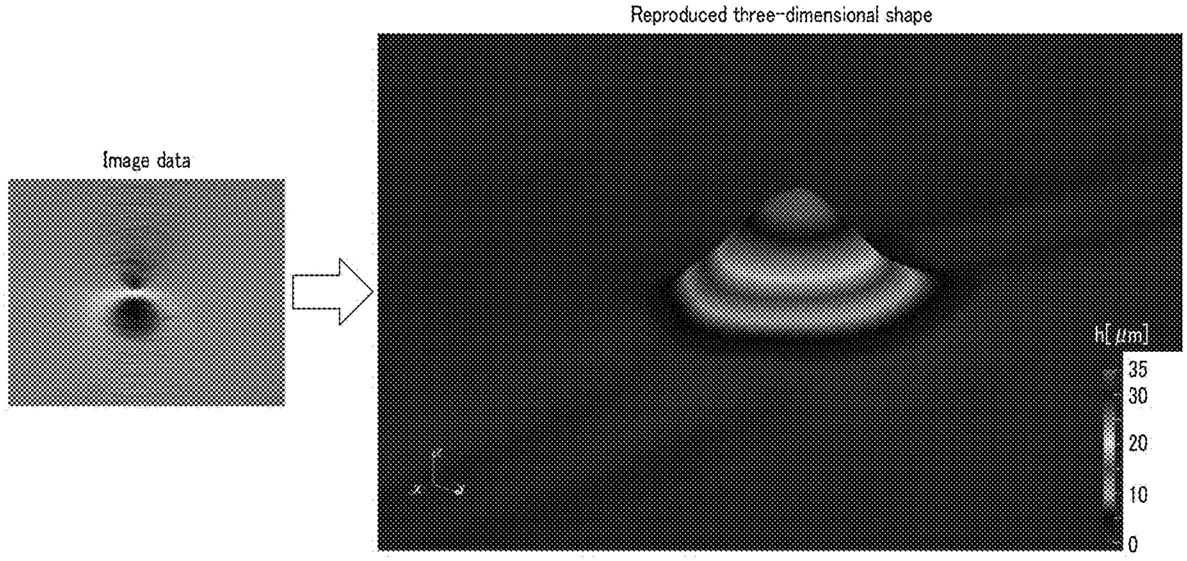
FIG. 7 is a view showing an example of a three-dimensional shape reproduced from the image shown in FIG. 6.

The image sensor 44 acquires a hue in each pixel when acquiring the image data shown in FIG. 6. The processing apparatus 14 calculates the direction component θx of light with respect to a minute ridge from the hue of each pixel. The processing apparatus 14 calculates the direction components θx of light in all the pixels. The processing apparatus 14 then obtains the heights h of the surface of the object S from the direction components θx of light by using equation (2). Aggregating these heights will depict the three-dimensional shape shown in FIG. 7. Referring to FIG. 7, the heights h of the reproduced (reconstructed) three-dimensional shape are indicated by using color contour lines.

As described above, in the optical system 10, light beam directions are color-mapped from the image captured through the anisotropic wavelength selection portion that selects wavelengths to be shielded and passed from reflected light from the surface (object surface) of the object S illuminated with parallel light depending on the rotational direction around the optical axis L, thereby calculating the three-dimensional shape information of the surface of the object S from the geometric optics relational expression between the inclination angle θx of the surface of the object S and the light beam direction.

According to this embodiment, there can provide a method of calculating the three-dimensional shape information of an object surface, the optical system 10, a non-transitory storage medium storing a calculation program for the three-dimensional shape information of the surface of the object S, and the processing apparatus 14 for the optical system 10, which acquire the three-dimensional shape information of the surface of the object S without spectrally dividing a light beam on the illumination side.

(Second Embodiment) (Area Sensor Type)

An optical system 10 according to the second embodiment will be described with reference to FIG. 8. This embodiment is a modification of the optical system 10 according to the first embodiment. The same members as those described in the first embodiment or members having the same functions will be denoted by the same reference numerals as possible, and a detailed description thereof will be omitted.

Figure 8:
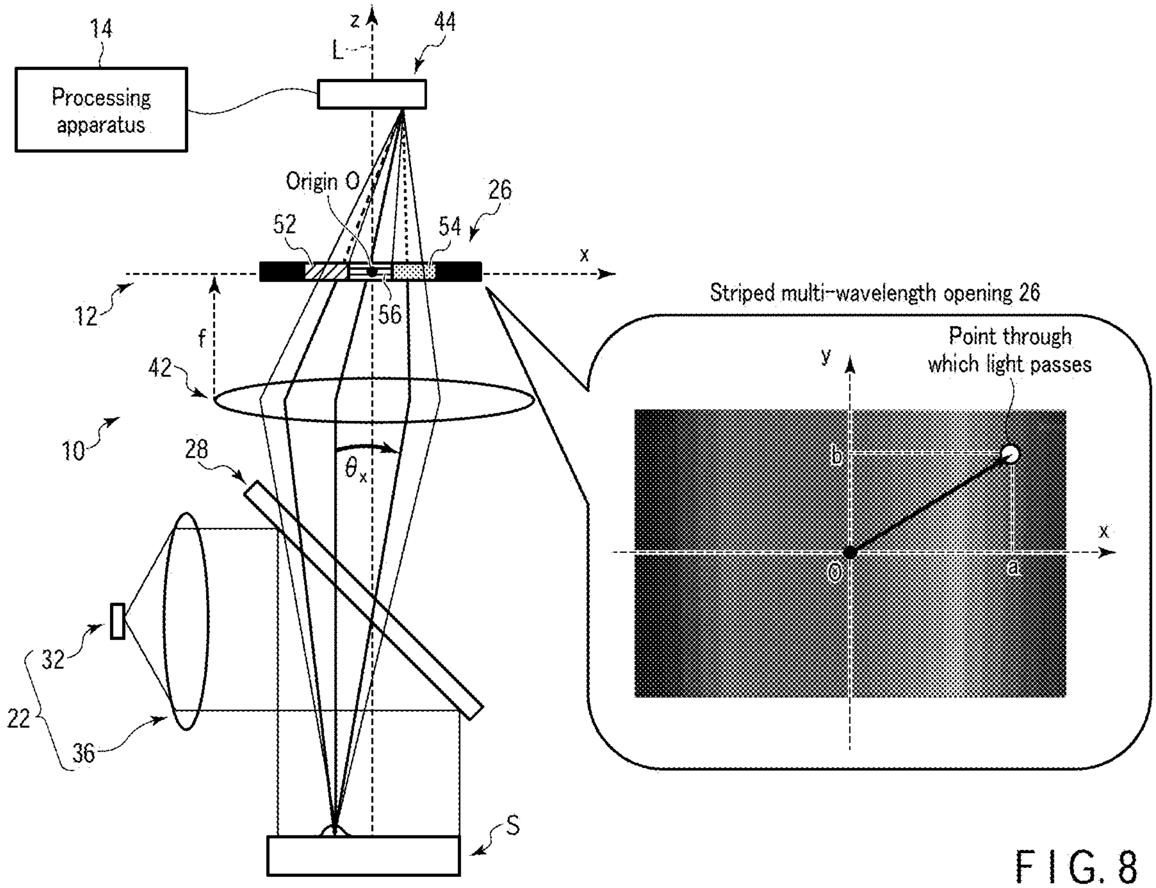
FIG. 8 is a schematic view showing an optical system according to the second embodiment.

FIG. 8 is a sectional view taken along a schematic x-z plane of the optical system 10 according to this embodiment.

The basic arrangement of an optical apparatus 12 for the optical system 10 according to this embodiment is basically the same as that of the optical apparatus 12 for the optical system 10 according to the first embodiment.

A wavelength selection portion (multi-wavelength opening) 26 is arranged on the focal plane of an imaging optical element 42 unlike the optical apparatus 12 described in the first embodiment. That is, the wavelength selection portion 26 can be arranged in an imaging portion 24. As described in the first embodiment, the wavelength selection portion 26 is anisotropic. In this case, the wavelength selection portion 26 is formed as a third wavelength selection region 56 that passes a light beam having a wavelength corresponding to green (G) light and shields against light beams having other wavelengths at an origin O. The wavelength selection portion 26 is formed as a first wavelength selection region 52 that is adjacent to the third wavelength selection region 56 in the −x-axis direction, passes a light beam having a wavelength corresponding to blue, and shields against light beams having other wavelengths. The wavelength selection portion 26 is formed as a second wavelength selection region 54 that is adjacent to the third wavelength selection region 56 in the +x-axis direction, passes a light beam having a wavelength corresponding to red, and shields against light beams having other wavelengths.

An image sensor 44 is an area sensor.

The operation of the optical system 10 described above will be described.

The illumination portion 22 irradiates the surface of an object S with substantially parallel light through the beam splitter 28.

A light beam propagating from an object point on the surface of the object S parallelly to the optical axis L passes through the origin O (the green region in FIG. 8) of the wavelength selection portion 26. In contrast to this, a light beam propagating obliquely from the object point to an optical axis L passes through a position (a, b) away from the origin O on the wavelength selection portion 26. Light beams become light beams having different wavelength spectra according to the regions of the wavelength selection portion 26 through which the light beams have passed. In this case, when a light beam is projected on an x-z plane, a direction component of light has an inclination angle θx with respect to the optical axis L. In the optical system 10, the direction component θx of light is obtained as the value obtained by dividing a that is the x-coordinate of the position on the wavelength selection portion 26 through which the light has passed by a focal length f. At this time, the light beam changes in color depending on the direction component θx. The relationship between such a direction component of light and color remains the same independently of the position of the object point. The optical system 10 can identify the direction components θx of light with colors in all the pixels of an acquired captured image. That is, in the optical system 10, since the wavelength selection portion 26 is arranged on the focal plane of the imaging optical element 42, the direction components θx of light can be identified with colors even if an object point is not located on the optical axis L.

As described above, in the optical system 10 according to this embodiment, it is possible to identify the direction components θx of light with colors even if an object point on the surface of the object S is located other than on the optical axis of the imaging optical element 42.

Even if the optical apparatus 12 according to this embodiment is used, a first adjustment portion 74 and/or a second adjustment portion 76 described in the first embodiment can be used.

According to this embodiment, there can provide a method of calculating the three-dimensional shape information of an object surface, the optical system 10, a non-transitory storage medium storing a calculation program for the three-dimensional shape information of the surface of the object S, and the processing apparatus 14 for the optical system 10, which acquire the three-dimensional shape information of the surface of the object S without spectrally dividing a light beam on the illumination side.

(Third Embodiment) (Line Sensor Type)

An optical system 10 according to the third embodiment will be described with reference to FIG. 9. This embodiment is a modification of the optical systems 10 according to the first and second embodiments. The same members as those described in the first and second embodiments or members having the same functions will be denoted by the same reference numerals as possible, and a detailed description thereof will be omitted.

Figure 9:
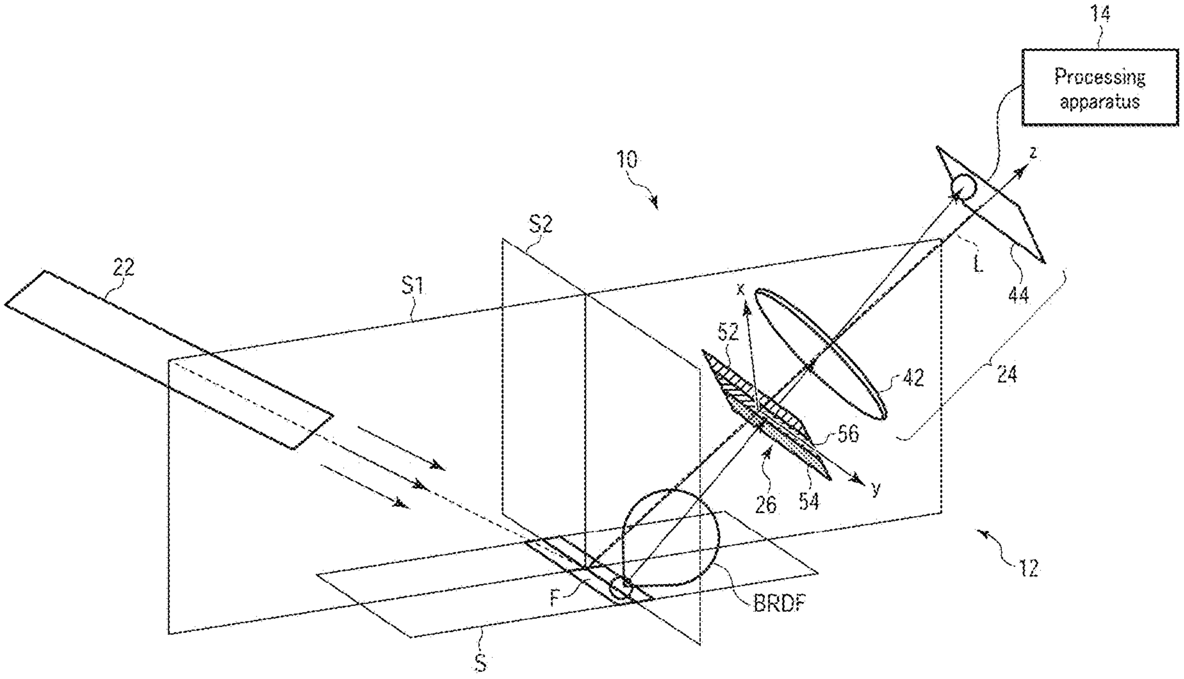
FIG. 9 is a schematic view showing an optical system according to the third embodiment.

FIG. 9 is a perspective view of the optical system 10 according to this embodiment. A projection view of an optical apparatus 12 according to this embodiment on a first cross-section S1 in FIG. 9 is basically the same as the optical apparatus 12 (see FIG. 1) according to the first embodiment.

First of all, in the optical apparatus 12 for the optical system 10 according to this embodiment, an optical system is formed without using a beam splitter 28.

An image sensor 44 is a line sensor.

A cross-section including the optical axis L of the imaging optical element 42 and orthogonal to the longitudinal direction of the image sensor (line sensor) 44 is the first cross-section S1. In the first cross-section S1, light from an illumination portion 22 which is projected on this cross-section is parallel light. A cross-section orthogonal to the first cross-section S1 is a second cross-section S2. In the second cross-section S2, light from the illumination portion 22 which is projected on the cross-section S2 may be or not be parallel light or diffused light. Assume that in this case, the light is diffused light.

A wavelength selection portion 26 includes a plurality of (three) wavelength selection regions 52, 54, and 56. Assume that each of the wavelength selection regions and 52, 54, and 56 intersects the x-axis and has a stripe shape elongated along the y-axis. In the first cross-section S1, the three wavelength selection regions and 52, 54, and 56 are arranged. That is, in the first cross-section S1, projection images of the wavelength selection regions and 52, 54, and 56 of the wavelength selection portion 26 on the first cross-section S1 anisotropically change with respect to the optical axis L. In contrast to this, in the second cross-section S2 orthogonal to the first cross-section S1, projection images of the wavelength selection regions and 52, 54, and 56 of the wavelength selection portion 26 on the cross-section S1 do not change along the y-axis.

The illumination portion 22 irradiates the surface of the object S with light to form an irradiation field F. The irradiation field F of the illumination portion 22 is formed into a line or rectangular shape on the surface of the object S. An image of the first object point in the irradiation field F is formed at the first image point on the line sensor 44 by the imaging optical element 42. At the first object point, the BRDF becomes the first BRDF. The first light beam includes the first BRDF.

In the first cross-section S1, the spread of the distribution of the first BRDF can be identified with the wavelength spectrum of light passing through the wavelength selection regions and 52, 54, and 56 of the wavelength selection portion 26. When light reaches an image point in the line sensor 44, the line sensor 44 identifies the light as a color corresponding to the wavelength spectrum. This makes the optical system 10 possible to identify a BRDF with a color. When the optical system 10 acquires a BRDF, the optical system 10 can identify the presence/absence of a minute defect on the surface of the object S. In addition, if a BRDF has a narrow distribution, the optical system 10 can acquire an inclination angle component θx of light. When the optical system 10 can acquire the inclination angle component θx of the light, the optical system 10 can acquire the minute three-dimensional shape information of the surface of the object S.

This embodiment uses a line sensor as the image sensor 44. The image sensor (line sensor) 44 is characterized by being able to accurately acquire an image of the surface of an object S during conveyance in a predetermined direction at a predetermined speed or the like. Accordingly, using the optical system 10 according to the embodiment makes it possible to accurately inspect the surface of the object S during conveyance and acquire the three-dimensional shape information of the surface of the object S.

In this embodiment, elongating the line sensor 44 and the illumination portion 22 in the longitudinal direction can acquire an image of the surface of the object S which is wide. For example, the sizes of the line sensor 44 and the illumination portion 22 in the longitudinal direction can be set to several 100 mm to several 1,000 mm. The same applies to the line sensor 44 according to the first embodiment.

Since this embodiment is configured such that the wavelength selection portion 26 is arranged in front of the imaging portion 24, this optical system can be incorporated in any type of imaging portion (that is, camera) 24. That is, in the optical system 10, the optical system is advantageous in having a wide selection range of cameras.

Assume also that the wavelength selection portion 26 is supported by a support portion 72, and the support portion 72 can cause a second adjustment portion 76 to rotate the wavelength selection portion 26. This makes the optical system 10 possible to acquire an accurate BRDF distribution by imaging the surface of the object S in accordance with the rotation of the wavelength selection portion 26 according to the rotation of the support portion 72. Alternatively, the optical system 10 can also acquire a component θy of inclination angle components in the y-axis direction as well as a component ex of the inclination angle components in the x-axis direction.

As described above, even if the line sensor 44 is used, the second adjustment portion 76 can be used.

Note that even if the line sensor 44 is used, the distance between the wavelength selection portion 26 and the surface of the object S may be adjusted by using a first adjustment portion 74.

According to this embodiment, there can provide a method of calculating the three-dimensional shape information of an object surface, the optical system 10, a non-transitory storage medium storing a calculation program for the three-dimensional shape information of the surface of the object S, and a processing apparatus 14 for the optical system 10, which acquire the three-dimensional shape information of the surface of the object S without spectrally dividing a light beam on the illumination side.

According to at least one of the embodiments described above, there can provide a method of calculating the three-dimensional shape information of an object surface, the optical system 10, a non-transitory storage medium storing a calculation program for the three-dimensional shape information of the surface of the object S, and the processing apparatus 14 for the optical system 10, which acquire the three-dimensional shape information of the surface of the object S without spectrally dividing a light beam on the illumination side.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of calculating three-dimensional shape information of an object surface, the method comprising:

acquiring an image captured through an anisotropic wavelength selection portion having a plurality of different regions changing in a specific direction so as to select a wavelength to be shielded and a wavelength to be passed from reflected light from the object surface illuminated with light, the anisotropic wavelength selection portion being configured to pass different wavelengths through the plurality of different regions in the specific direction, and to pass the same wavelength through respective one of the plurality of different regions in a direction perpendicular to the specific direction;

color-mapping, based on the image, an inclination angle of a light beam in the specific direction with respect to an optical axis; and calculating three-dimensional shape information of the object surface from a geometric optics relational expression between an inclination angle of the object surface in the specific direction and the inclination angle of the light beam in the specific direction.

2. The method according to claim 1, wherein the illumination is parallel light, and the method comprises illuminating the object surface with the parallel light.

3. The method according to claim 1, wherein the geometric optics relational expression is a partial differential equation that partially differentiates a height h of the object surface by using a position of an object point projected on an imaging plane and is represented by $$\nabla h(x, y) = -\frac{1}{2}\begin{pmatrix} \theta_x \\ \theta_y \end{pmatrix}$$

where:

x, y, and h represent the position of the object point on the object surface,

θx represents an inclination angle of an x-direction component of specularly reflected light at the object point, and θy represents an inclination angle of a y-direction component of specularly reflected light at the object point.

4. The method according to claim 1, wherein the acquiring the image includes imaging a light beam passing through an imaging optical element on an image sensor.

5. The method according to claim 4, wherein the image sensor comprises a line sensor, the anisotropic wavelength selection portion has a stripe shape parallel to a longitudinal direction of the line sensor.

6. The method according to claim 5, further comprising adjusting a distance between the anisotropic wavelength selection portion and the object surface.

7. The method according to claim 4, wherein the image sensor comprises an area sensor.

8. An optical system comprising a processor configured to:

acquire an image captured through an anisotropic wavelength selection portion having a plurality of different regions changing in a specific direction so as to select a wavelength to be shielded and a wavelength to be passed from reflected light from an object surface illuminated with light, the anisotropic wavelength selection portion being configured to pass different wavelengths through the plurality of different regions in the specific direction, and to pass the same wavelength through respective one of the plurality of different regions in a direction perpendicular to the specific direction, color-map, based on the image, an inclination angle of a light beam in the specific direction with respect to the optical axis, and calculate three-dimensional shape information of the object surface from a geometric optics relational expression between an inclination angle of the object surface and the inclination angle of the light beam in the specific direction.

9. The system according to claim 8, wherein the processor executes, as the geometric optics relational expression, a partial differential equation that partially differentiates a height h of the object surface by using a position of an object point projected on an imaging plane and is represented by $$\nabla h(x, y) = -\frac{1}{2}\begin{pmatrix}\theta_x \\ \theta_y\end{pmatrix}$$

where:

x, y, and h represent the position of the object point on the object surface,

θx represents an inclination angle of an x-direction component of specularly reflected light at the object point, and θy represents an inclination angle of a y-direction component of specularly reflected light at the object point.

10. The system according to claim 8, further comprising a first adjustment portion configured to optimize a distance between the anisotropic wavelength selection portion and the object surface.

11. The system according to claim 8, further comprising:

a support portion configured to support the anisotropic wavelength selection portion; and a second adjustment portion configured to rotate the anisotropic wavelength selection portion around the optical axis.

12. The system according to claim 8, further comprising:

an illumination portion configured to illuminate the object surface with parallel light;

an imaging portion configured to be directed to a region of the object surface which is illuminated with the parallel light; and the anisotropic wavelength selection portion provided between the object surface and the imaging portion and configured to select a wavelength to be shielded and a wavelength to be passed from reflected light from the object surface, the anisotropic wavelength selection portion depending on a rotational direction around the optical axis.

13. The system according to claim 12, wherein:

the imaging portion uses a line sensor as a color image sensor, and the anisotropic wavelength selection portion has a stripe shape parallel to a longitudinal direction of the line sensor.

14. A non-transitory storage medium storing a three-dimensional shape information calculation program for causing a processor to execute:

acquiring an image captured through an anisotropic wavelength selection portion having a plurality of different regions changing in a specific direction so as to select a wavelength to be shielded and a wavelength to be passed from reflected light from the object surface illuminated with light, the anisotropic wavelength selection portion being configured to pass different wavelengths through the plurality of different regions in the specific direction, and to pass the same wavelength through respective one of the plurality of different regions in a direction perpendicular to the specific direction, color-mapping, based on the image, an inclination angle of a light beam in the specific direction with respect to the optical axis, and calculating three-dimensional shape information of the object surface from a geometric optics relational expression between an inclination angle of the object surface in the specific direction and the inclination angle of the light beam in the specific direction.

15. A processing apparatus for an optical system, the apparatus comprising:

a non-transitory storage medium storing the three-dimensional shape information calculation program according to claim 14; and a processor configured to read out the program stored in the non-transitory storage medium from the non-transitory storage medium and execute the program.

16. The method according to claim 1, wherein in an xyz orthogonal coordinate system defined with a z-axis extending along the optical axis, an x-axis orthogonal to the z-axis, and a y-axis orthogonal to the x-axis and the z-axis, the anisotropic wavelength selection portion intersects the z-axis at an origin of the xyz coordinate system and the plurality of different regions of the anisotropic wavelength selection portion intersect the x-axis, and the color-mapping comprises discriminating, in a case where a light beam is projected to an x-z plane, whether an x-direction component θx in a reflecting direction of light with respect to the optical axis is positive or negative with respect to the origin, wherein the x-direction component θx represents an inclination angle of an x-direction component of specularly reflected light at an object point projected on an imaging plane.

17. The method according to claim 3, wherein if a periphery of the object point is flat, the height h at a position (x, y, h) of the object surface is given by $$h(x, y) = -\int_{x_0}^{x} \frac{\theta_x(x', y)}{2} dx'$$

where:

$x=x_0$ represents a peripheral flat portion, where a height is 0.

18. The system according to claim 8, wherein in an xyz orthogonal coordinate system defined with a z-axis extending along the optical axis, an x-axis orthogonal to the z-axis, and a y-axis orthogonal to the x-axis and the z-axis, the anisotropic wavelength selection portion intersects the z-axis at an origin of the xyz coordinate system and the plurality of different regions of the anisotropic wavelength selection portion intersect the x-axis, and the color-mapping by the processor comprises the processor discriminating, in a case where a light beam is projected to an x-z plane, whether an x-direction component θx in a reflecting direction of light with respect to the optical axis is positive or negative with respect to the origin, wherein the x-direction component θx represents an inclination angle of an x-direction component of specularly reflected light at an object point projected on an imaging plane.

19. The system according to claim 9, wherein if a periphery of the object point is flat, the height h at a position (x, y, h) of the object surface is given by $$h(x, y) = -\int_{x_0}^{x} \frac{\theta_x(x', y)}{2} dx'$$

where:

$x=x_0$ represents a peripheral flat portion, where a height is 0.

20. The system according to claim 12, wherein the imaging portion comprises:

an image sensor including at least one pixel configured to receive at least a plurality of light beams differing in wavelength, and an imaging optical element configured to collect, to a conjugate image point on the image sensor, a light beam group from an object point, and the anisotropic wavelength selection portion is arranged in front of the imaging optical element of the imaging portion.

21. The non-transitory storage medium according to claim 14, wherein in an xyz orthogonal coordinate system defined with a z-axis extending along the optical axis, an x-axis orthogonal to the z-axis, and a y-axis orthogonal to the x-axis and the z-axis, the anisotropic wavelength selection portion intersects the z-axis at an origin of the xyz coordinate system and the plurality of different regions of the anisotropic wavelength selection portion intersect the x-axis, and causing the processor to execute the color-mapping comprises causing the processor to discriminate, in a case where a light beam is projected to an x-z plane, whether an x-direction component θx in a reflecting direction of light with respect to the optical axis is positive or negative with respect to the origin, wherein the x-direction component θx represents an inclination angle of an x-direction component of specularly reflected light at an object point projected on an imaging plane.

22. The non-transitory storage medium according to claim 14, wherein the processor is caused to execute, as the geometric optics relational expression, a partial differential equation that partially differentiates a height h of the object surface by using a position of an object point projected on an imaging plane and is represented by $$\nabla h(x, y) = -\frac{1}{2}\begin{pmatrix} \theta_x \\ \theta_y \end{pmatrix}$$

where:

x, y, and h represent the position of the object point on the object surface,

θx represents an inclination angle of an x-direction component of specularly reflected light at the object point, and θy represents an inclination angle of a y-direction component of specularly reflected light at the object point, and if a periphery of the object point is flat, the height h at a position (x, y, h) of the object surface is given by $$h(x, y) = -\int_{x_0}^{x} \frac{\theta_x(x', y)}{2} dx'$$

where:

$x=x_0$ represents a peripheral flat portion, where a height is 0.

* * * * *